United States Patent
Venugopal et al.

(10) Patent No.: US 12,143,976 B2
(45) Date of Patent: Nov. 12, 2024

(54) SIGNALING-OVERHEAD REDUCTION WITH RESOURCE GROUPING

(71) Applicant: QUALCOMM Incorporated, San Diego, CA (US)

(72) Inventors: Kiran Venugopal, Raritan, NJ (US); Tao Luo, San Diego, CA (US); Tianyang Bai, Somerville, NJ (US); Jung Ho Ryu, Fort Lee, NJ (US); Yan Zhou, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/242,622

(22) Filed: Apr. 28, 2021

(65) Prior Publication Data

US 2021/0250935 A1 Aug. 12, 2021

Related U.S. Application Data

(63) Continuation of application No. 16/801,672, filed on Feb. 26, 2020.

(Continued)

(51) Int. Cl.
*H04W 72/04* (2023.01)
*H04W 16/28* (2009.01)
(Continued)

(52) U.S. Cl.
CPC ......... *H04W 72/046* (2013.01); *H04W 16/28* (2013.01); *H04W 28/06* (2013.01); *H04W 72/23* (2023.01)

(58) Field of Classification Search
CPC ... H04W 72/046; H04W 16/28; H04W 28/06; H04W 72/042; H04W 76/11;
(Continued)

(56) References Cited

U.S. PATENT DOCUMENTS

| 11,496,279 B2 | 11/2022 | Grant et al. |
| 2017/0094680 A1 | 3/2017 | Patel et al. |

(Continued)

FOREIGN PATENT DOCUMENTS

| CN | 108347778 A | 7/2018 |
| CN | 108809600 A | 11/2018 |

(Continued)

OTHER PUBLICATIONS

European Search Report—EP22157402—Search Authority—Munich—Jun. 2, 2022.

(Continued)

*Primary Examiner* — Steven Hieu D Nguyen

(74) *Attorney, Agent, or Firm* — Procopio, Cory, Hargreaves & Savitch LLP

(57) ABSTRACT

A configuration for configuring and updating the spatial relationship of multiple physical uplink control channel (PUCCH) resources in a single message, thereby reducing signaling overhead. A user equipment (UE) constructs a message associated with at least one of a plurality of component carriers (CCs) or a plurality of bandwidth parts (BWPs) indicating a same spatial relation for the at least one of the plurality of CCs or the plurality of BWPs. The UE transmits the message to a base station. The base station transmits a message to the UE configuring multiple spatial parameters for the at least one of the plurality of CCs, the plurality of BWPs, or a plurality of uplink/downlink resources.

36 Claims, 11 Drawing Sheets

Related U.S. Application Data

(60) Provisional application No. 62/826,810, filed on Mar. 29, 2019.

(51) Int. Cl.
  *H04W 28/06* (2009.01)
  *H04W 72/044* (2023.01)
  *H04W 72/23* (2023.01)

(58) Field of Classification Search
  CPC ..... H04L 5/0051; H04L 5/001; H04L 5/0023; H04L 5/0048; H04L 5/0091; H04B 7/0695
  See application file for complete search history.

(56) References Cited

U.S. PATENT DOCUMENTS

| | | | |
|---|---|---|---|
| 2018/0227908 A1 | 8/2018 | Wang et al. | |
| 2018/0242327 A1 | 8/2018 | Frenne et al. | |
| 2018/0331727 A1 | 11/2018 | John Wilson et al. | |
| 2019/0230545 A1 | 7/2019 | Liou et al. | |
| 2019/0280757 A1 | 9/2019 | Yang et al. | |
| 2019/0349170 A1 | 11/2019 | Li et al. | |
| 2019/0364556 A1 | 11/2019 | Davydov et al. | |
| 2020/0007292 A1 | 1/2020 | Huang et al. | |
| 2020/0053721 A1* | 2/2020 | Cheng | H04B 7/0408 |
| 2020/0106645 A1 | 4/2020 | Tsai et al. | |
| 2020/0107341 A1* | 4/2020 | Zhang | H04L 5/0035 |
| 2020/0119778 A1 | 4/2020 | Grant et al. | |
| 2020/0177265 A1* | 6/2020 | Guan | H04B 7/088 |
| 2020/0178280 A1* | 6/2020 | Guan | H04B 7/0626 |
| 2020/0244317 A1 | 7/2020 | Wu et al. | |
| 2020/0280409 A1* | 9/2020 | Grant | H04L 5/0044 |
| 2020/0280425 A1* | 9/2020 | Wu | H04L 5/0078 |
| 2020/0314829 A1 | 10/2020 | Venugopal et al. | |
| 2020/0322957 A1 | 10/2020 | Tomeba et al. | |
| 2020/0389883 A1* | 12/2020 | Faxér | H04L 5/0053 |
| 2020/0389885 A1 | 12/2020 | Tomeba et al. | |
| 2020/0412506 A1* | 12/2020 | Määttanen | H04B 7/0413 |
| 2021/0184749 A1 | 6/2021 | Chen et al. | |
| 2022/0094510 A1 | 3/2022 | Zhang et al. | |

FOREIGN PATENT DOCUMENTS

| | | | | |
|---|---|---|---|---|
| CN | 109391962 A | | 2/2019 | |
| EP | 3573276 A1 | | 11/2019 | |
| EP | 3657839 A1 | | 5/2020 | |
| WO | 2017053642 A1 | | 3/2017 | |
| WO | WO-2018075205 A1 | * | 4/2018 | ........... H04L 5/0051 |
| WO | 2018232090 A1 | | 12/2018 | |
| WO | 2019029360 A1 | | 2/2019 | |

OTHER PUBLICATIONS

3GPP TS 38.321, "3rd Generation Partnership Project; Technical Specification Group Radio Access Network; NR; Medium Access Control (MAC) Protocol Specification (Release 15)", 3GPP Standard, Technical Specification, 3GPP TS 38.321, V15.4.0, 3RD Generation Partnership Project (3GPP). vol. RAN WG2, No. V15. 4.0, Dec. 2018, Jan. 11, 2019 (Jan. 11, 2019), pp. 1-77, XP051591686, [retrieved on Jan. 11, 2019] Section 5.1, p. 13-p. 22, Section 6.1.5, p. 69-p. 70, Para. 5.18.8 and Para. 6.1.3.18.

Ericsson: "Remaining Issues on Beam Measurement and Reporting", 3GPP TSG-RAN WG1 Meeting #93, 3GPP Draft, R1-1806217, 3rd Generation Partnership Project (3GPP), vol. RAN WG1, No. Busan, Korea, May 21, 2018-May 25, 2018, May 20, 2018, pp. 1-13, XP051441426, Retrieved from Internet: URL: http://www.3gpp.org/ftp/Meetings%5F3GPP%5FSYNC/RAN1/Docs/ & http://www.3gpp.org/ftp/tsg%5Fran/WG1%5FRL1/TSGR1%5F93/Docs [retrieved on May 20, 2018] Paragraphs 2.1.2 and 2.1.3, Paragraph [2.2.1] section 2. The Whole Document.

International Search Report and Written Opinion—PCT/US2020/020090—ISA/EPO—May 20, 2020.

LG Electronics: "Feature Lead Summary of Enhancements on Multi-Beam Operations", 3GPP Draft, R1-1903686 R1#96, 3GPP TSG RAN WG1 Meeting #96, Updated_FL_Summary_Multibeam (MB1) V4, 3RD Generation-Partnership Project (3GPP), vol. RAN WG1, No. Athens, Greece, Feb. 25, 2019-Mar. 1, 2019, Mar. 3, 2019 (Mar. 3, 2019), XP051690937, pp. 1-25, Retrieved from the Internet: URL: http://www.3gpp.org/ftp/tsg%5Fran/WG1%5FRL1/TSGR1%5F96/Docs/R1%2D1903686%2Ezip [retrieved on Mar. 3, 2019] Para 3.2 and Ref [17].

Ericsson: "UL Beam Selection Improvements", 3GPP Draft, 3GPP TSG-RAN WG1 Meeting #95, R1-1813609, UL Beam Selection Improvements, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051479948, 4 Pages, Retrieved from the Internet: URL: http://www.3gpp.org/ftp/tsg65Fran/WG1%5FRL1/TSGR1%5F95/Docs/R1%2D1813609%2Ezip. [retrieved on Nov. 3, 2018] sections 2, 2.1.1-2.1.3.

Ericsson: "Enhancements to Multi-Beam Operation", 3GPP Draft, 3GPP TSG-RAN WG1 Meeting #96, R1-1902529, Enhancements to Multi-Beam Operation, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600225, 15 pages, Retrieved from the Internet: URL: http://www.3gpp.org/ftp/tsg%5Fran/WG1%5FRL1/TSGR1%5F96/Docs/R1%2D1902529%2Ezip [retrieved on Feb. 15, 2019].

LG Electronics: "Updated Feature Lead Summary of Enhancements on Multi-Beam Operations", 3GPP TSG RAN WG1 Meeting #95, R1-1814122, Spokane, USA, Nov. 12-16, 2018, pp. 1-26.

Nokia, et al., "Enhancements on Multi-Beam Operation", 3GPP TSG RAN WG1 Meeting #96, R1-1902564, Athens, Greece, Feb. 25-Mar. 1, 2019, 22 Pages, https://www.3gpp.org/ftp/tsg_ran/WG1_RL1/TSGR1_96/Docs/R1-1902564.zip.

ZTE: "Remaining Issues on NR Physical Downlink Control Channel", 3GPP TSG RAN WG1 Meeting #94bis, R1-1810339, Chengdu, China, Oct. 8-12, 2018, 11 Pages.

Qualcomm Incorporated: "Maintenance for physical downlink control channel", 3GPP TSG RAN WG1 Meeting #94-Bis, R1-1811234, Chengdu, China, Oct. 8-12, 2018. pp. 1-6.

* cited by examiner

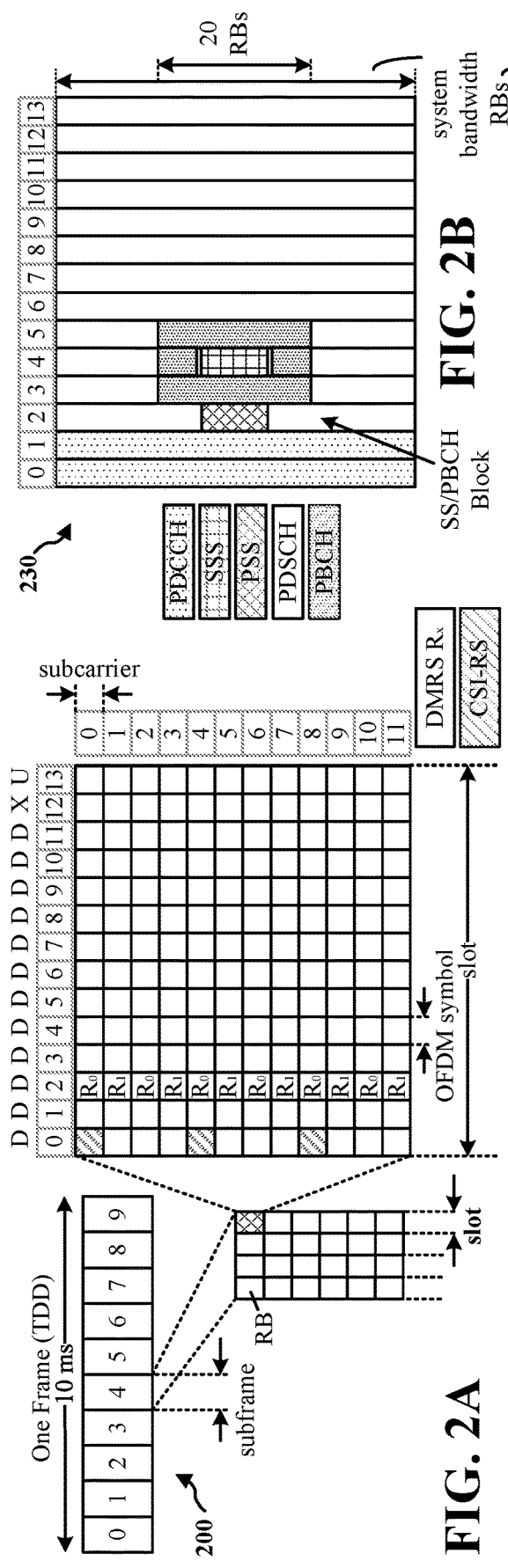
FIG. 2A
FIG. 2B
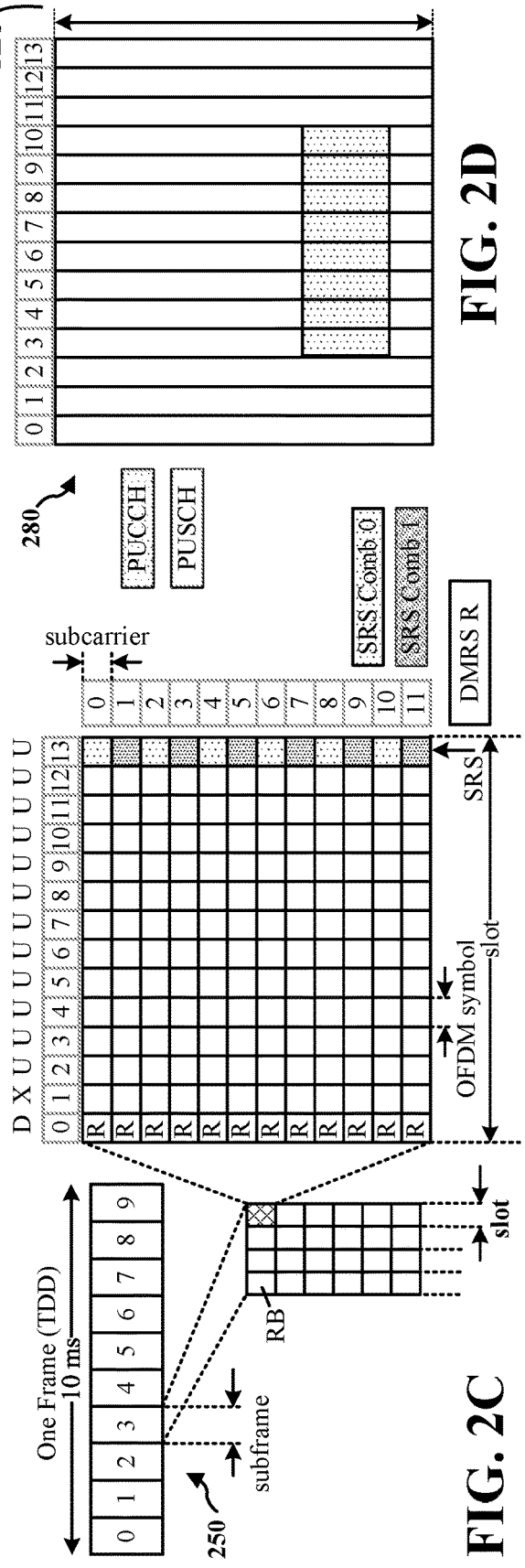
FIG. 2C
FIG. 2D

SIGNALING-OVERHEAD REDUCTION WITH RESOURCE GROUPING

CROSS REFERENCE TO RELATED APPLICATION(S)

This application is a Continuation of U.S. patent application Ser. No. 16/801,672, entitled "SIGNALING-OVERHEAD REDUCTION WITH RESOURCE GROUPING" and filed on Feb. 26, 2020, which claims the benefit of U.S. Provisional Application Ser. No. 62/826,810, entitled "Signaling-Overhead Reduction with Resource Grouping" and filed on Mar. 29, 2019, which are expressly incorporated by reference herein in their entirety.

BACKGROUND

Technical Field

The present disclosure relates generally to communication systems, and more particularly, to a reduction of signaling overhead in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A network may signal a User Equipment (UE) to configure the UE, e.g., to configure the UE for operation in a wireless network that supports 5G NR. Communication such as 5G NR, may use directional transmission and reception, and configuration information may be exchanged between the UE and the base station to ensure that the transmitter and the receiver use the same configured set of beams for communication. In order to update certain fields and spatial properties, the base station may transmit signaling, e.g., via a medium access control (MAC) control element (CE), to indicate or activate the spatial relationship or to provide the quasi co-location (QCL) information for the set of beams to be used for the communication between the UE and the base station. However, MAC-CEs may only update or configure the spatial relationship for physical uplink control channel (PUCCH) resources one at a time, such that increased signaling is used to update or configure multiple PUCCH resources. This increased signaling results in signaling overhead which could be inefficient and could impact network performance.

Techniques disclosed herein are directed to minimizing the signaling overhead for updating and configuring the spatial relationship for multiple resources and/or channels, such as but not limited to PUCCH, and support simultaneous configuration and updating of multiple resources. For example, the disclosure allows for the spatial relationship of multiple resources to be configured and updated in reduced messages, such as in a single message. In addition, multiple downlink and uplink resources may be updated simultaneously. Thus, aspects presented herein enable a reduction in signaling overhead and provide a more efficient use of wireless resources In an aspect of the disclosure, a method, a computer-readable medium, and an apparatus are provided for reducing signaling overhead for both updating and configuring spatial parameters and support simultaneous configuration and updating of multiple resources. The apparatus constructs a message associated with at least one of a plurality of component carriers (CCs) or a plurality of bandwidth parts (BWPs) indicating a same spatial relation for the at least one of the plurality of CCs or the plurality of BWPs. The apparatus may transmit the message to a base station.

In another aspect of the disclosure, a method, a computer-readable medium, and an apparatus are provided. The apparatus constructs a message associated with at least one of a plurality of component carriers (CCs), a plurality of bandwidth parts (BWPs), or a plurality of uplink (UL)/downlink (DL) resources configuring multiple spatial parameters for the at least one of the plurality of CCs, the plurality of BWPs, or the plurality of UL/DL resources. The apparatus transmits the message to a UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
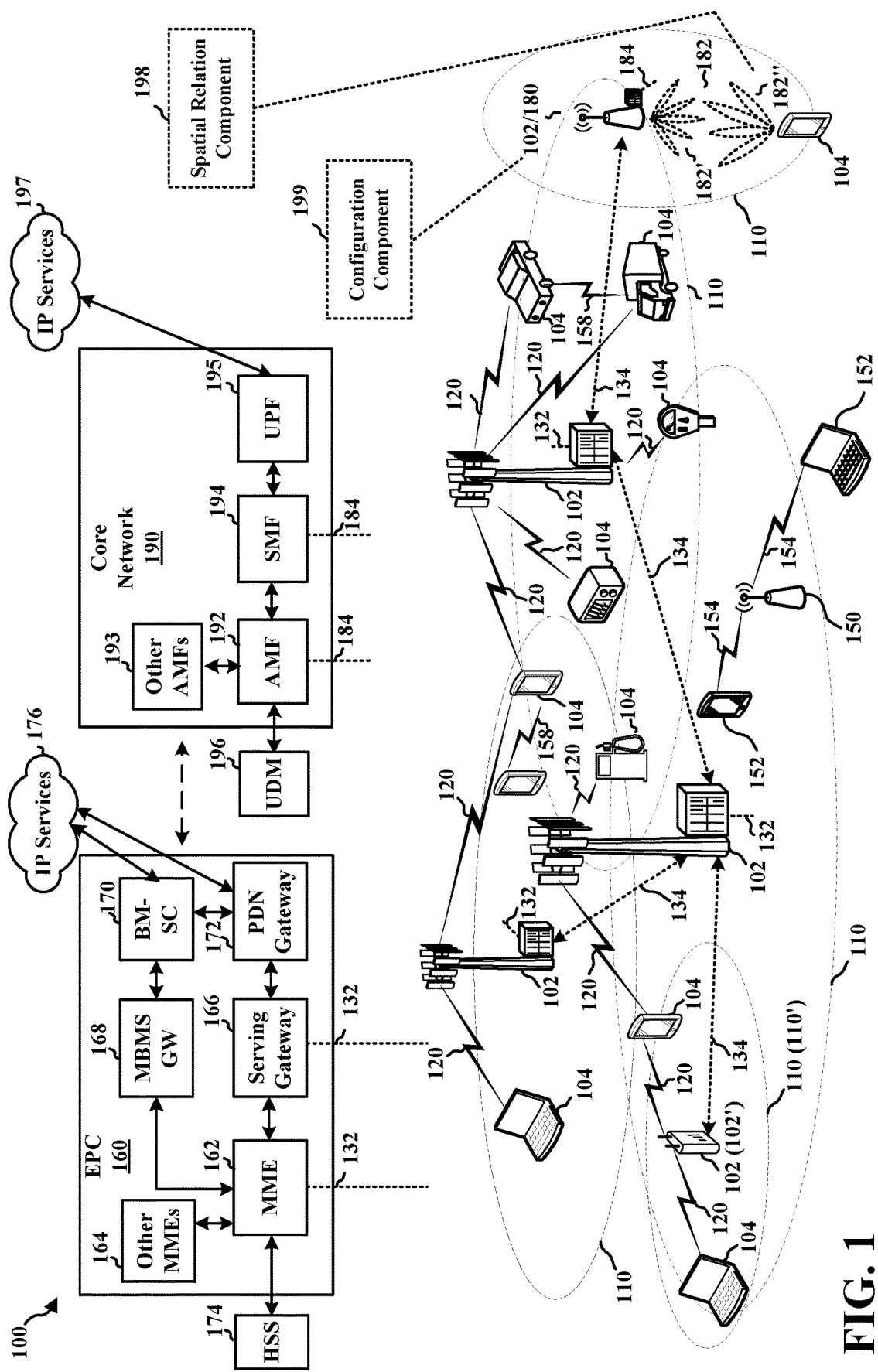
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to report to a base station (e.g., 180) the frequency ranges in which it assumes the same spatial properties. The UE 104 may be configured to generate a single report for a group of CCs or BWPs indicating that the same spatial relation may be assumed across the indicated frequency ranges. For example, the UE 104 of FIG. 1 includes a spatial relation component 198 configured to construct a message associated with at least one of a plurality of CCs or a plurality of BWPs indicating a same spatial relation for the at least one of the plurality of CCs or the plurality of BWPs. The UE 104 may transmit the message to a base station (e.g., 180).

Referring again to FIG. 1, in certain aspects, base station 180 may be configured to configure spatial parameters for multiple UL/DL channels or resources, including over multiple CCs or BWPs. For example, the base station 180 of FIG. 1 includes a configuration component 199 configured to construct a message associated with at least one of a plurality of CCs, a plurality of BWPs, or a plurality of UL/DL resources configuring multiple spatial parameters for the at least one of the plurality of CCs, the plurality of BWPs, or the plurality of UL/DL resources. The base station 180 may transmit the message to a UE (e.g., 104).

Although the following description may be focused on 5G NR, the concepts described herein may be applicable to other similar areas, such as LTE, LTE-A, Code Division Multiple Access (CDMA), Global System for Mobile communications (GSM), and/or other wireless/radio access technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
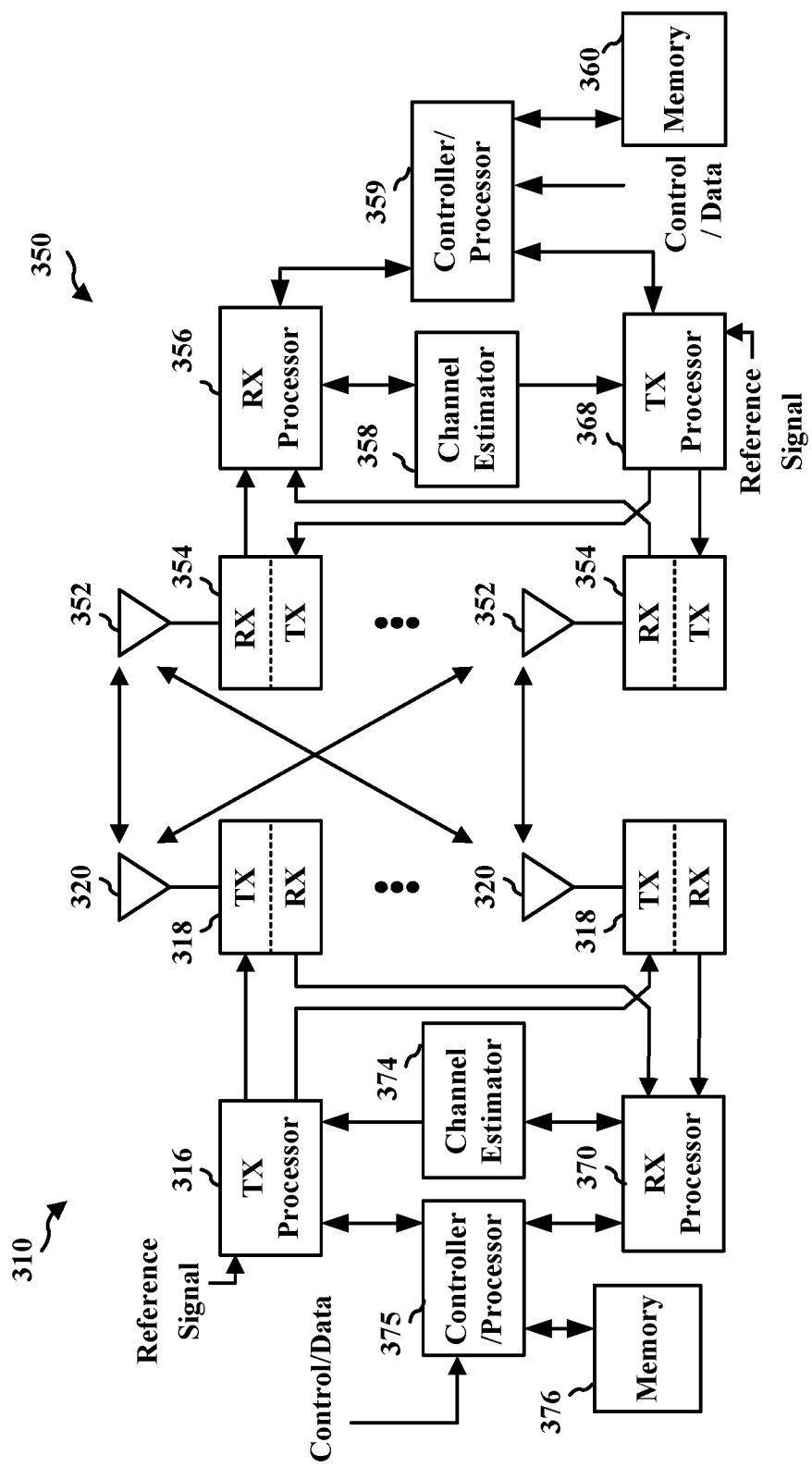
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Wireless communication between a base station and a UE may use directional transmission and reception, such that configuration information is provided and exchanged between the UE and the base station to ensure that the transmitter and receiver use the same configured set of beams for communication. For example, 5G NR based wireless communication may be exchanged using directional beams. Beamforming may be applied to uplink channels, such as but not limited to PUCCH. One or more spatial relations between the uplink and downlink signals may be configured for beamformed communication. A spatial relation between an uplink signal and a downlink signal indicates that a UE may transmit the uplink signal using the same beam as it used for receiving the corresponding downlink signal.

In order to update certain fields and spatial properties of channels and/or resources, such as PUCCH for example, signaling (e.g., MAC-CE) transmitted by the base station is typically utilized. However, a MAC-CE may update one resource at a time and multiple MAC-CEs would be transmitted between the UE and base station to update the multiple resources. Aspects presented herein improve the manner in which spatial relationship is configured and/or updated such that multiple resources may be configured and updated simultaneously.

The present disclosure relates to improving the manner in which spatial properties are configured and/or updated and may reduce signaling overhead due to multiple groups of resources being able to be configured and/or updated simultaneously. A group of resources may be configured and/or updated with a single message, which reduces strain on the network and may free up limited frequency resources.

Figure 4:
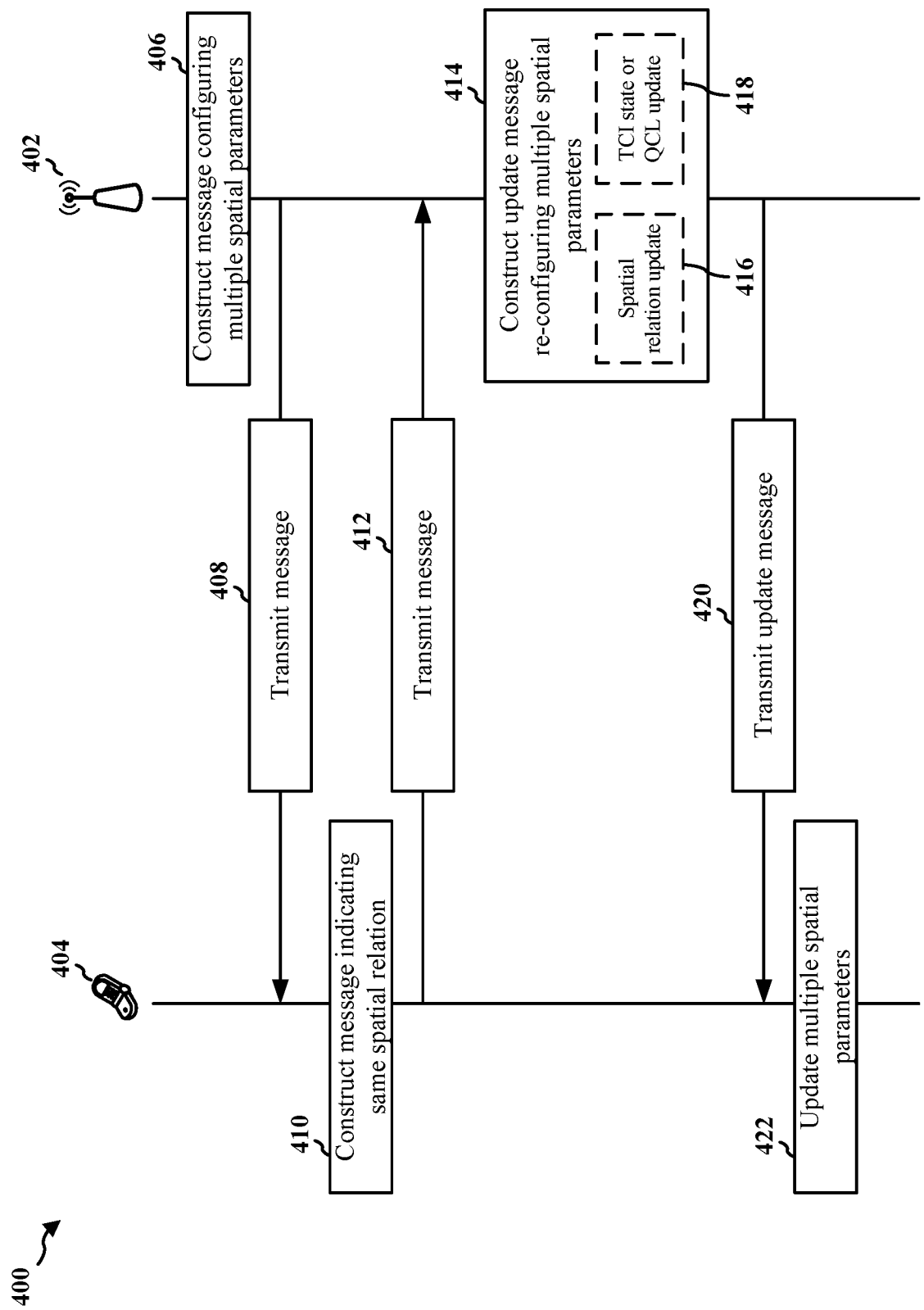
FIG. 4 is a call flow diagram of signaling between a UE and a base station in accordance with certain aspects of the disclosure.

FIG. 4 is a call flow diagram of signaling between a UE and a base station in accordance with aspects of the disclosure. The diagram 400 of FIG. 4 includes a base station 402 and a UE 404. The base station 402 may be configured to provide a cell. For example, in the context of FIG. 1, the base station 402 may correspond to base station 102/180 and, accordingly, the cell may include a geographic coverage area 110 in which communication coverage is provided and/or a small cell 102' having a coverage area 110'. Further, UE 404 may correspond to base station 310 and the UE 504 may correspond to UE 350.

The base station 402 may configure multiple spatial parameters. For example, the base station 402 may construct a message 406 configuring multiple spatial parameters for multiple groups of resources. The message 406 may be associated with at least one of a plurality of component carriers (CCs), a plurality of bandwidth parts (BWPs), or a plurality of uplink (UL)/downlink (DL) resources. The message 406 may configure multiple spatial parameters for at least one of the plurality of CCs, the plurality of BWPs, or the plurality of UL/DL resources. The base station 402 may then transmit the message 406 to the UE 404. In some aspects, the base station 402 may transmit the message 406 to the UE 404 via a MAC-CE. The spatial parameters for the multiple groups of resources may be configured via the MAC-CE. In some aspects, the message 406 may include information indicating a plurality of resource groups associated with the plurality of BWPs or the plurality of CCs. In some aspects, the message 406 may include configuration information of the spatial parameters that correspond to each of the plurality of resource groups associated with at least one of the plurality of BWPs, the plurality of CCs, or the plurality of UL/DL resources.

The UE 404, upon receipt of the message 406 from the base station 402, may process the message 406 and apply the multiple spatial parameters in accordance with the message 406.

The UE 404 may be configured to construct a message 410 associated with at least one of a plurality of CCs or a plurality of BWPs. The message 410 may indicate a same spatial relation for the at least one of the plurality of CCs or the plurality of BWPs. In some aspects, the message 410 may be associated with one of a PUCCH or a PUSCH on which the same spatial relation applies for the at least one of the plurality of CCs or the plurality of BWPs. The UE 404 may transmit the message 404 to the base station 402. The message 404 may include status information of the multiple spatial parameters. For example, the UE 404 may be configured to report to the base station 402 the frequency ranges and CCs in which the UE 404 would assume the same spatial properties. The UE 404 may assume that the same spatial properties indicates that the same QCL or transmission configuration indication (TCI) state are utilized for the DL signal reception, while the same spatial relationship is utilized for the UL transmission from the UE 404 side. As such, the UE 404, instead of reporting a per-carrier beam report, may be configured to report a single beam report for a group of carriers or BWPs, thereby indicating that the same spatial relationship may be assumed across the indicated frequency ranges. The UE 404 may transmit the message 410 to the base station 402. In some aspects, the message 410 may be one of a beam report or a MAC-CE.

At least one advantage of the disclosure is that the base station 402 may utilize the message 410 from the UE 404 to generate an update message (e.g., 414) to update and/or re-configure the spatial parameters for multiple uplink resources. The update message may update the spatial relationship of multiple UL resources in a single message. The update message updating multiple UL resources in a single message allows for the reduction of signaling overhead while supporting the grouping of resources. At least another advantage of the disclosure is that the base station 402 may utilize the message 410 from the UE 404 to update TCI states and QCL assumptions for multiple DL resources. In some aspects, the update message 414 may be associated with other PHY channels such as, but not limited to, PUSCH, PDSCH, PUCCH.

The base station 402, may utilize the message 412 from the UE 402 to provide updated spatial parameters to multiple groups of resources. In some aspects, the base station 402 may provide a spatial parameter update for multiple DL/UL channels or resources, including over multiple BWPs or CCs. The base station 402 may receive, from UE 404, a message 412 associated with at least one of the plurality of CCs or the plurality of BWPs. The message 412 may indicate a same spatial relation for the at least one of the plurality of CCs or the plurality of BWPs. The base station 402 may construct a single update message 414. The single update massage 414 may be based on the message 412 received from the UE 404. The single update message 414 may include re-configuration information of the spatial parameters for each of the plurality of resource groups associated with at least one of the plurality of BWPs, the plurality of CCs, or the plurality of UL/DL resources. The base station 402 may utilize the information within the message 410, sent by UE 404, to activate, re-configure, and/or update the spatial parameters for the multiple groups of resources, and provides such updated spatial parameters in the single update message 414.

In some aspects, the simultaneous update/indication of a single spatial relation per group of PUCCH may be supported by using one MAC-CE. In some aspects, the group may correspond to all of the PUCCHs in a BWP when a single active spatial relation is applied before and/or after activation. The simultaneous update/indication of a single spatial relation per group of PUCCH resources by using MAC-CE may include explicit higher layer signaling on the PUCCH resource grouping. For example, in some aspects, the explicit higher layer signaling on the PUCCH resource grouping may include a group identifier within each PUCCH resource. In some aspects, the explicit higher layer signaling on the PUCCH resource grouping may include defining a new PUCCH group, which may include identities of PUCCH resources.

In some aspects, for example, simultaneous spatial relation update across multiple CCs and/or BWPs, up to two lists of CCs may be based on an indication in the MAC-CE. The UE may expect no overlapped CCs in multiple groups of CCs. The groups for simultaneous spatial relation update may be different from those for simultaneous TCI state activation.

In some aspects, simultaneous TCI state identification (ID) activation may be performed via a MAC-CE where a same TCI state ID is applied for all the BWPs in a configured CCs In some aspects, the update message 414 may include an update of the spatial relation in association with at least one of the plurality of CCs or the plurality of BWPs, wherein the update message 414 is based on the message 410 transmitted by the UE 402. In some aspects, the update message may include an update of at least one of TCI states or a QCL assumption in association with at least one of the plurality of CCs or the plurality of BWPs, wherein the update message 414 is based on the message 410 transmitted by the UE 402.

At least one advantage of the disclosure is that the update message 414 may be configured to indicate spatial relationship information for multiple groups of resources or multiple resource groups/sets. This allows the base station 402 to update multiple groups of resources using a single message, reducing the amount of signaling, which in turn reduces the signaling overhead. In some aspects, the update message 414 may be a MAC-CE, wherein the spatial parameters for the plurality of resource groups are re-configured via the MAC-CE. The MAC-CE may be configured to indicate updates for multiple groups or resources using the single MAC-CE. In some aspects, the single MAC-CE may indicate the same update for multiple groups, while in some aspects, the single MAC-CE may indicate different updates for multiple groups. Thus, the MAC-CE may be configured to provide one or more updates for the plurality of resource groups.

Figure 5A:
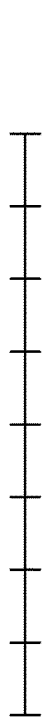
FIGS. 5a-5c are illustrations of multiple resource groups in accordance with certain aspects of the disclosure.
Figure 5B:
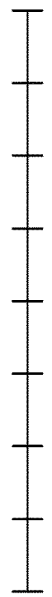
Figure 5C:

FIGS. 5a-c are illustrations of multiple resource groups in accordance with certain aspects of the disclosure. For example, the diagram 500 may be a modified PUCCH spatial relation Activation/Deactivation MAC-CE. The MAC-CE may include an identifier that identifies groups of resources to which the spatial relation Activation/Deactivation applies. The PUCCH spatial relation Activation/Deactivation MAC-CE 500 may have a fixed size of 24 bits and may include a Serving Cell ID which indicates the identity of the Serving Cell for which the MAC-CE applies. In the aspect of FIG. 5a, the length of the Serving Cell ID field is 5 bits, but the length may be greater than or less than 5 bits. The MAC-CE 500 may include a BWP ID which indicates a UL BWP for which the MAC-CE applies as a codepoint of the DCI bandwidth part indicator field. The length of the BWP ID may be 2 bits, but may be less than or greater than 2 bits. The MAC-CE 500 may include a PUCCH Resource ID which contains an identifier of the PUCCH resource ID. The length of the PUCCH Resource ID of MAC-CE 500 is shown as having a length of 3 bits, but may be greater than or less than 3 bits. The MAC-CE 500 may also include a Resource set ID having a length of 2 bits. The MAC-CE may include one or more activation fields $S_i$, where the activation field $S_i$ is set to 1 to indicate activation of spatial relation, and the activation field $S_i$ is set to 0 to indicate deactivation of spatial relation, where $0 \leq i \leq N$. In some aspects, one or more of the activation fields $S_i$ may be associated with one or more of the multiple resource groups, such that the one or more activation fields $S_i$ convey the updated spatial relationship information for the multiple resource groups. In some aspects, the one or more activation fields $S_i$ may convey the updated spatial relationship information for a particular ID.

The resource groups within the MAC-CE 500 may be based on at least one or more of a resource ID, a resource set ID, a CC ID, a BWP ID, and/or a combination thereof. At least one advantage of the disclosure is that the MAC-CE 500 is consistent with the payload of existing PUCCH spatial relation Activation/Deactivation MAC-CE. In some aspects, the PUCCH Resource ID of the existing PUCCH spatial relation Activation/Deactivation MAC-CE may be partitioned into different lengths to allow for the inclusion of other resource groups, such as but not limited to a resource ID, a resource set ID, a CC ID, or a BWP ID. In some aspects, a first set of activation fields $S_i$ may be associated with one or more resource groups within the modified MAC-CE 500, while a second set of activation fields $S_i$ may be associated with one or more of the remaining resource groups not associated with the first set of activation fields $S_i$. The first and/or second set of activation fields $S_i$ may have the same or different amount of activation fields. In some aspects, the modified MAC-CE may have one or more sets of activation fields $S_i$ and each set of activation field may be comprised of one or more activation fields, and is not intended to be limited to the aspects disclosed herein.

The modified MAC-CEs 525 and 550 may be configured in a manner similar to the modified MAC-CE 500, while having the same or different resource groups. As such, the modified MAC-CEs 525 and 550 are additional aspects of the disclosure.

In some aspects, the modified MAC-CE (not shown) may have fields added in order to convey multiple resource group IDs and multiple spatial information IDs, by having a variable length MAC-CE. Although the MAC-CEs 500, 525, and 550 are discussed in relation to a PUCCH, the disclosure is not intended to be limited to PUCCH. The modified MAC-CE may apply to other channels in either of the UL or DL side. In addition, the disclosure is not intended to be limited to the aspects of the modified MAC-CEs 500, 525, and 550. The modified MAC-CEs may be configured in many different combination of resources and the disclosure is not intended to be limited to the aspects disclosed herein.

Referring back to FIG. 4, the base station 402 may transit the single update message 414 to the UE 404. The single update message 414 may be a MAC-CE, wherein the spatial parameters for the plurality of resource groups are re-configured via the MAC-CE.

The UE 404 receives the update message 414 and updates the multiple spatial parameters in accordance with the update message 414. In some aspects, the UE 404 may receive, from the base station 402, a spatial relation update 416 in association with at least one of the plurality of CCs or the plurality of BWPs. The spatial relation update 416 may be based on the message 410 transmitted by the UE 404 to the base station 402. The spatial relation update 416 may be associated with update message 414.

In some aspects, the UE 404 may receive, from the base station 402, a TCI state or QCL update 418 comprising an update of at least one of the TCI states or QCL assumption in association with at least one of the plurality of CCs or the plurality of BWPs. The update 418 may be based on the message 410 transmitted by the UE 404 to the base station 402. The update 418 may be associated with update message 414.

Figure 6:
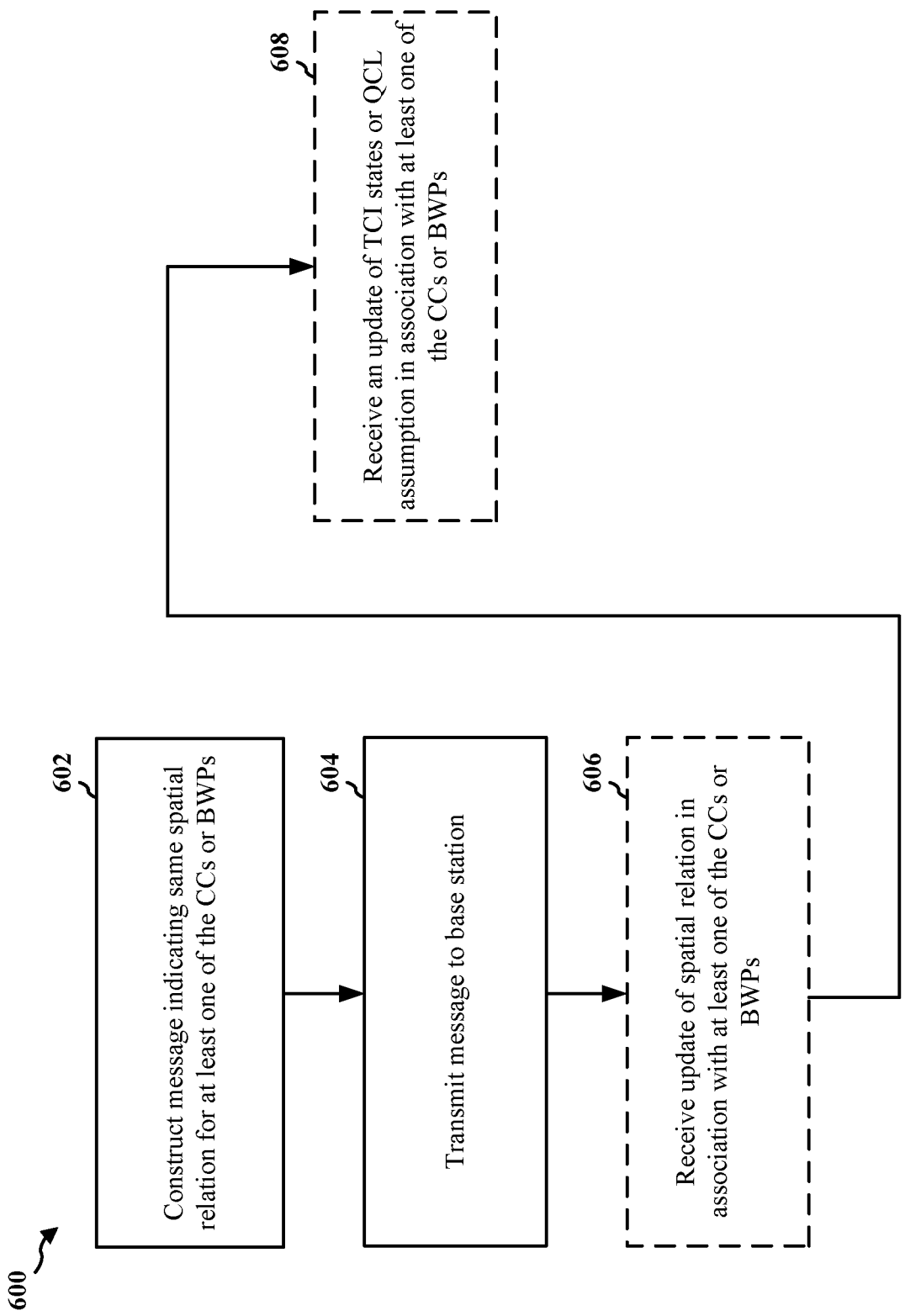
FIG. 6 is a flowchart of a method of wireless communication.

FIG. 6 is a flowchart 600 of a method of wireless communication. The method may be performed by a UE or a component of a UE (e.g., the UE 104, 350, 404, 1050; the apparatus 702/702'; the processing system 814, which may include the memory 360 and which may be the entire UE or a component of the UE, such as the TX processor 368, the RX processor 356, and/or the controller/processor 359). According to various aspects, one or more of the illustrated operations of method 600 may be omitted, transposed, and/or contemporaneously performed. Optional aspects are illustrated with a dashed line. Aspects of the method may assist a UE to construct a message indicating a same spatial relation for at least one of the plurality of CCs or the plurality of BWPs.

At 602, the UE may construct a message (e.g., 410) associated with at least one of a plurality of CCs or a plurality of BWPs indicating a same spatial relation for the at least one of the plurality of CCs or the plurality of BWPs, as shown in connection with FIG. 4. For example, 602 may be performed by spatial relation component 706. At 604, the UE (e.g., 404) may transmit the message (e.g., 410) to a base station (e.g., 402). For example, 604 may be performed by transmission component 712. In some aspects, the message (e.g., 410) may be associated with one of a PUCCH or a PUSCH on which the same spatial relation applies for the at least one of the plurality of CCs or the plurality of BWPs. In some aspects, the message (e.g., 410) may be a beam report or a MAC-CE.

At 606, the UE (e.g., 404) may receive an update (e.g., 414) of the spatial relation (e.g., 416) in association with the at least one of the plurality of CCs or the plurality of BWPs. For example, 606 may be performed by reception component 704. In some aspects, the UE (e.g., 404) may receive the update (e.g., 414) from the base station (e.g., 402). In some aspects, the update (e.g., 414) may be based on the message (e.g., 410) transmitted by the UE (e.g., 404) to the base station (e.g., 402). In some aspects, the update may indicate a plurality of resources using a resource group ID. The resource group ID may identify a group of PUCCH resources. In some aspects, the update may be received in a MAC-CE.

At 608, the UE (e.g., 404) may receive an update (e.g., 414) of at least one of TCI states or QCL assumption (e.g., 418) in association with the at least one of the plurality of CCs or the plurality of BWPs. For example, 608 may be performed by DL update component 710. In some aspects, the UE (e.g., 404) may receive the update (e.g., 414) from the base station (e.g., 402). In some aspects, the update (e.g., 414) may be based on the message (e.g., 410) transmitted by the UE (e.g., 404) to the base station (e.g. 402). In some aspects, the update (e.g., 414) may be associated with one of a PDCCH or a PDSCH.

Figure 7:
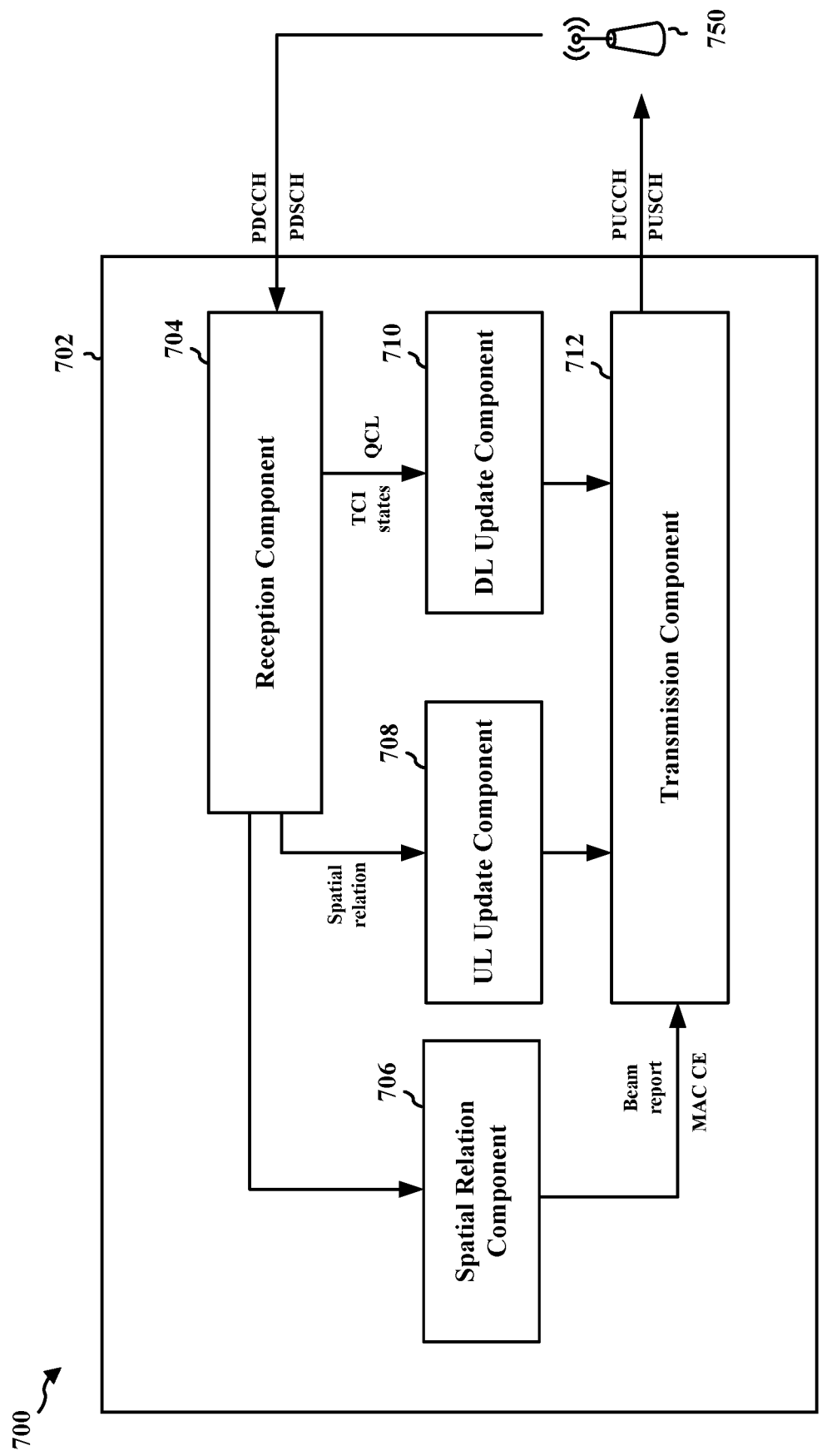
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE or a component of a UE. The apparatus includes a reception component 704 that may receive an update (e.g., 414) from the base station (e.g., 402), e.g., as described in connection with 606 or 608 of FIG. 6. The reception component 704 may be configured to receive various types of signals/messages and/or other information from other devices, including, for example, the base station 750. The apparatus includes a spatial relation component 706 that may construct a message (e.g., 410) associated with at least one of a plurality of CCs or a plurality of BWPs indicating a same spatial relation for the at least one of the plurality of CCs or the plurality of BWPs, e.g., as described in connection with 602 of FIG. 6. In some aspects, the message (e.g., 410) may be associated with one of a PUCCH or a PUSCH on which the same spatial relation applies for the at least one of the plurality of CCs or the plurality of BWPs. In some aspects, the message (e.g., 410) may be one of a beam report or a MAC-CE. The apparatus includes a UL update component 708 that may receive an update (e.g., 414) of the spatial relation (e.g., 416) in association with the at least one of the plurality of CCs or the plurality of BWPs, e.g., as described in connection with 606 of FIG. 6. In some aspects, the update (e.g., 414) may be based on a message (e.g., 410) transmitted by the UE (e.g., 404) to the base station (e.g., 402). The apparatus includes a DL update component 710 that may receive an update (e.g., 414) of at least one of TCI states or a QCL assumption (e.g., 418) in association with the at least one of the plurality of CCs or the plurality of BWPs, e.g., as described in connection with 608 of FIG. 6. In some aspects, the update (e.g., 414) may be based on a message (e.g., 410) transmitted by the UE (e.g., 404) to the base station (e.g., 402). In some aspects, the update (e.g., 414) may be associated with one of a PDCCH or a PDSCH. The apparatus includes a transmission component 712 that may transmit the message (e.g., 410) to the base station (e.g., 402), e.g., as described in connection with 604 of FIG. 6. The transmission component 712 may be configured to transmit various types of signals/messages and/or other information to other device, including, for example, the base station 750.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
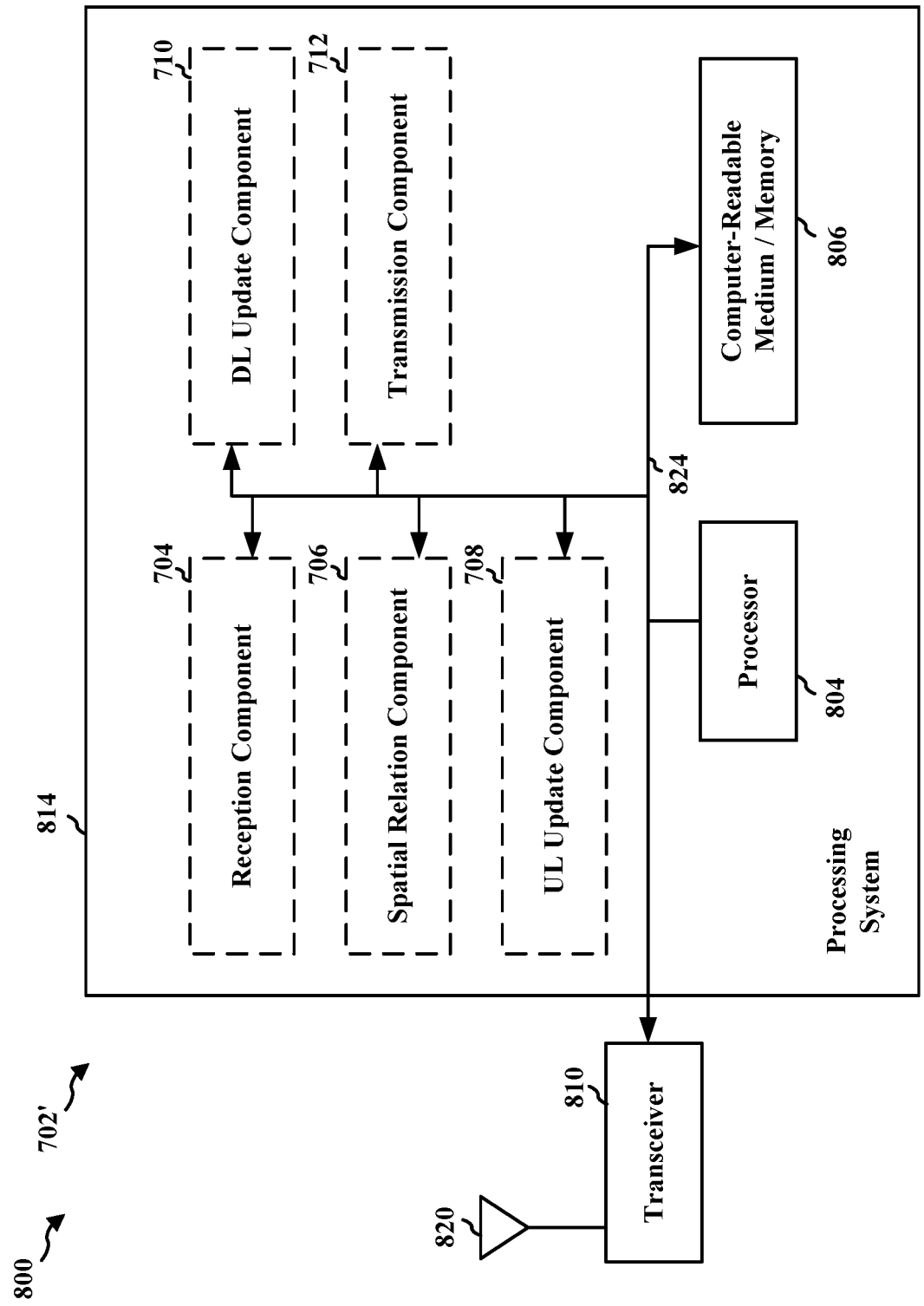
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for constructing a message associated with at least one of a plurality of CCs or a plurality of BWPs indicating a same spatial relation for the at least one of the plurality of CCs or the plurality of BWPs. The apparatus includes means for transmitting the message to a base station. The apparatus may further include means for receiving an update of the spatial relation in association with the at least one of the plurality of CCs or the plurality of BWPs. The update may be received from the base station. The update may be based on the message transmitted to the base station by the UE. The apparatus may further include means for receiving an updated of at least one of TCI states or a QCL assumption in association with the at least one of the plurality of CCs or the plurality of BWPs. The update may be received from the base station. The update may be based on the message transmitted to the base station by the UE. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
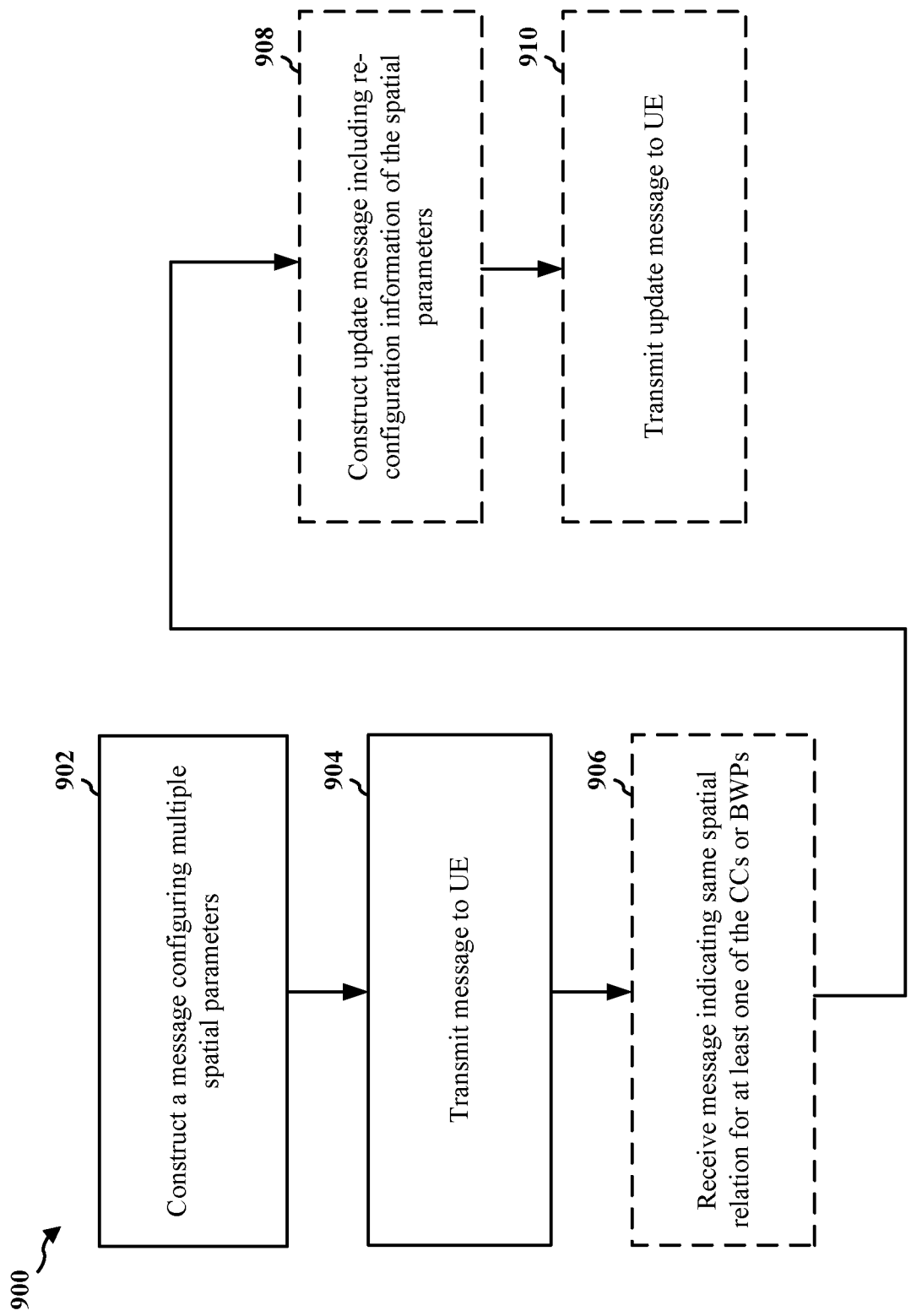
FIG. 9 is a flowchart of a method of wireless communication.

FIG. 9 is a flowchart 900 of a method of wireless communication. The method may be performed by a base station or a component of a base station (e.g., the base station 102, 180, 310, 402, 750; the apparatus 1002/1002'; the processing system 1114, which may include the memory 376 and which may be the entire base station or a component of the base station, such as the TX processor 316, the RX processor 370, and/or the controller/processor 375). According to various aspects, one or more of the illustrated operations of method 900 may be omitted, transposed, and/or contemporaneously performed. Optional aspects are illustrated with a dashed line. The method may be configured to configure spatial parameters for multiple UL/DL channels or resources, including over multiple CCs or BWPs.

At 902, the base station may construct a message (e.g., 406) associated with at least one of a plurality of CCs, a plurality of BWPs, or a plurality of UL/DL resources configuring multiple spatial parameters for the at least one of the plurality of CCs, the plurality of BWPs, or the plurality of UL/DL resources. For example, 902 may be performed by configuration component 1006. In some aspects, the message (e.g., 406) may include information indicating a plurality of resource groups associated with the plurality of BWPs or the plurality of CCs, and includes configuration information of the spatial parameters that applies for each of the plurality of resource groups associated with at least one of the plurality of BWPs, the plurality of CCs, or the plurality of UL/DL resources. In some aspects, each of the plurality of resource groups may be based on at least one of a resource identifier (ID), a resource set ID, a CC ID, or a BWP ID, or a combination thereof. In some aspects, the message (e.g., 406) may be a medium access control (MAC) control element (CE). In some aspects, the spatial parameters for the plurality of resource groups may be configured via the MAC-CE. At 904, the base station may transmit the message (e.g., 406) to a UE (e.g., 404). For example, 904 may be performed by transmission component 1012.

At 906, the base station may receive a message (e.g., 410) associated with at least one of the plurality of CCs or the plurality of BWPs indicating a same spatial relation for the at least one of the plurality of CCs or the plurality of BWPs. For example, 906 may be performed by spatial relation component 1008. The base station may receive the message from the UE.

At 908, the base station may construct a single update message (e.g., 414) including re-configuration information of the spatial parameters (e.g., 416, 418) for each of the plurality of resource groups associated with at least one of the plurality of BWPs, the plurality of CCs, or the plurality of UL/DL resources. For example, 908 may be performed by update component 1010. In some aspects, the single update message (e.g., 414) may be based on the message (e.g., 410) received from the UE (e.g., 404). In some aspects, the update message may indicate a plurality of resources using a resource group ID. The resource group ID may identify a group of PUCCH resources.

At 910, the base station may transmit the single update message (e.g., 414) to the UE (e.g., 404). For example, 910 may be performed by transmission component 1012. In some aspects, the single update message (e.g., 414) may be transmitted in a MAC-CE. In some aspects, the spatial parameters for the plurality of resource groups may be re-configured via the MAC-CE.

Figure 10:
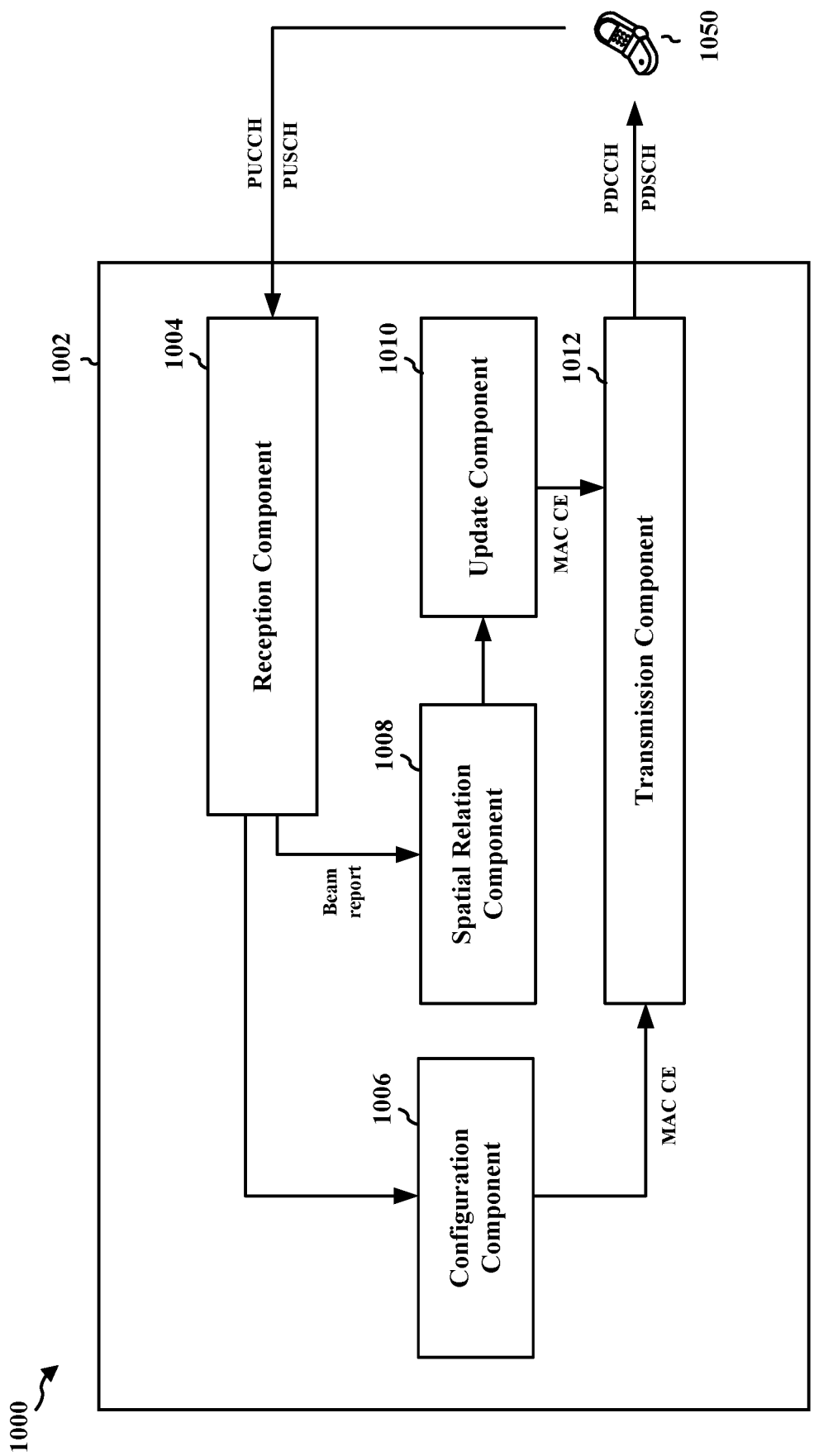
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station. The apparatus includes a reception component 1004 that may receive uplink signals or messages from the UE (e.g., 404), e.g., as described in connection with 906 of FIG. 9. The apparatus includes a configuration component 1006 that constructs a message (e.g., 406) associated with at least one of a plurality of component carriers (CCs), a plurality of bandwidth parts (BWPs), or a plurality of uplink (UL)/ downlink (DL) resources configuring multiple spatial parameters for the at least one of the plurality of CCs, the plurality of BWPs, or the plurality of UL/DL resources, e.g., as described in connection with 902 of FIG. 9. The apparatus includes a spatial relation component 1008 that receives, from the UE (e.g., 404) a message (e.g., 410) associated with at least one of the plurality of CCs or the plurality of BWPs indicating a same spatial relation for the at least one of the plurality of CCs or the plurality of BWPs, e.g., as described in connection with 906 of FIG. 9. The apparatus includes an update component 1010 that constructs a single update message (e.g., 414) including re-configuration information (e.g., 416, 418) of the spatial parameters for each of the plurality of resource groups associated with at least one of the plurality of BWPs, the plurality of CCs, or the plurality of UL/DL resources, e.g., as described in connection with 908 of FIG. 9. The single update message may be based on the message (e.g., 410) received from the UE (e.g., 404). The apparatus includes a transmission component 1012 that may transmit the message (e.g., 406) to the UE (e.g., 404), e.g., as described in connection with 904 of FIG. 9. The transmission component 1012 may also transmit the single update message (e.g., 414) to the UE (e.g., 404), e.g., as described in connection with 910 of FIG. 9.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
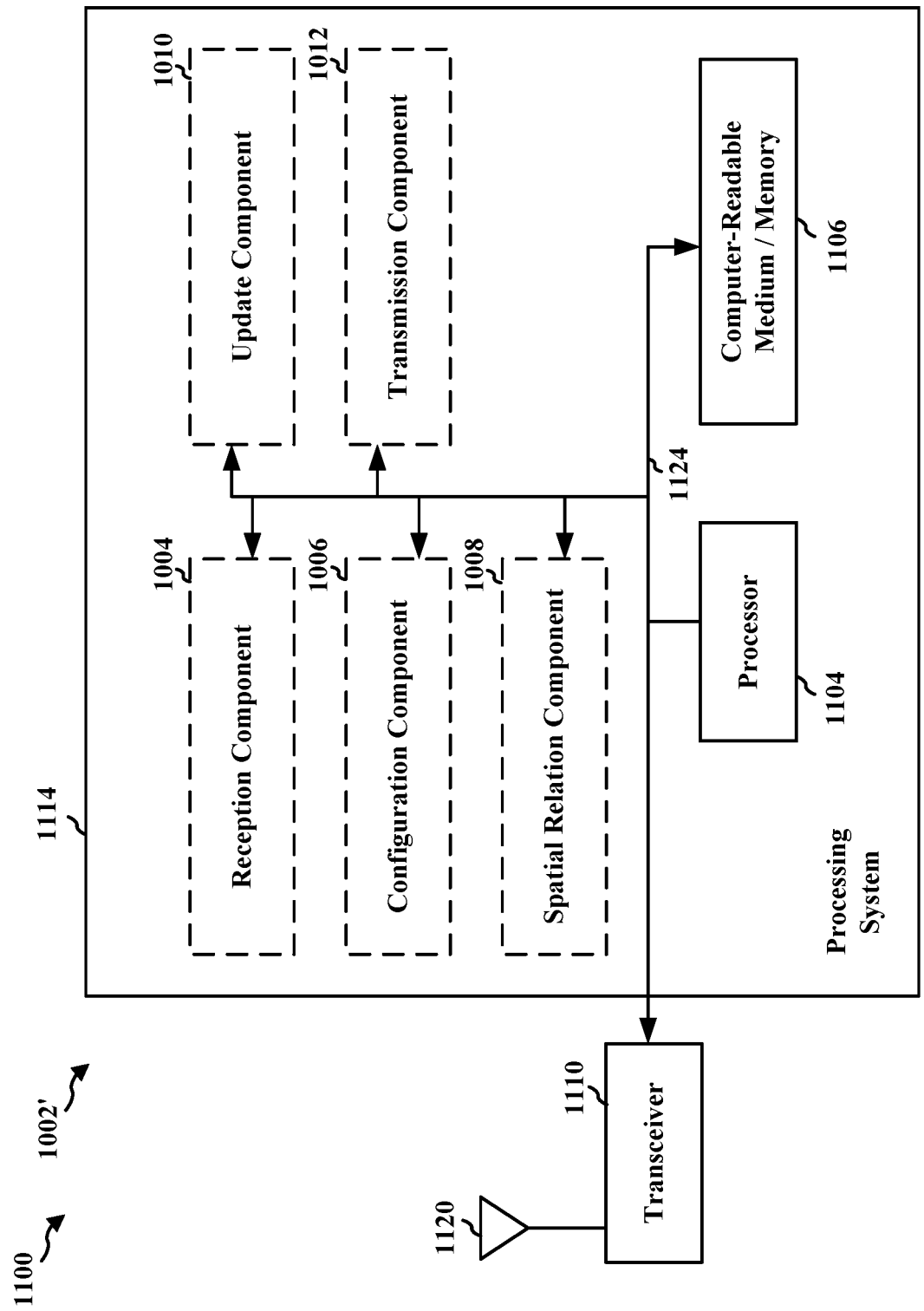
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof.

The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for constructing a message associated with at least one of a plurality of CCs, a plurality of BWPs, or a plurality of UL/DL resources configuring multiple spatial parameters for the at least one of the plurality of CCs, the plurality of BWPs, or the plurality of UL/DL resources. The apparatus includes means for transmitting the message to a UE. The apparatus further includes means for receiving, from the UE, a message associated with at least one of the plurality of CCs or the plurality of BWPs indicating a same spatial relation for the at least one of the plurality of CCs or the plurality of BWPs. The apparatus further includes means for constructing a single update message, based on the message received from the UE, including re-configuration information of the spatial parameters for each of the plurality of resource groups associated with at least one of the plurality of BWPs, the plurality of CCs, or the plurality of UL/DL resources. The apparatus further includes means for transmitting the single update message to the UE. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Techniques disclosed herein are directed to minimizing the signaling overhead for updating and configuring the spatial relationship for PUCCH resources and support simultaneous configuration and updating of multiple PUCCH resources. At least one advantage of the disclosure is that the base station 402 may be configured to utilize the message 410 from the UE 404 to generate an update message (e.g., 414) to update and/or re-configure the spatial parameters for multiple uplink resources. The update message may be configured to update the spatial relationship of multiple UL resources in a single message. The update message being configured to update multiple UL resources in a single message allows for the reduction of signaling overhead while supporting the grouping of resources. At least another advantage of the disclosure is that the base station 402 may utilize the message 410 from the UE 404 to update TCI states and QCL assumptions for multiple DL resources. At least one advantage of the disclosure is that the update message 414 may be configured to indicate spatial relationship information for multiple groups of resources. This allows the base station 402 to update multiple groups of resources using a single message, reducing the amount of signaling, which in turn reduces the signaling overhead. At least one advantage of the disclosure is that the modified MAC-CE 500 is consistent with the payload of existing PUCCH spatial relation Activation/Deactivation MAC-CE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples illustrate example embodiments. These embodiments and aspects of these embodiments may be used in combination with any previous embodiments or aspects of the previous embodiments disclosed or discussed in relation to the systems, methods, or devices of the figures.

Example 1 is a method of wireless communication of a UE that includes constructing a message associated with at least one of a plurality of CCs or a plurality of BWPs indicating a same spatial relation for the at least one of the plurality of CCs or the plurality of BWPs; and transmitting the message to a base station.

In Example 2, the method of Example 1 further includes receiving, from the base station, an update of the spatial relation in association with the at least one of the plurality of CCs or the plurality of BWPs, the update being based on the transmitted message.

In Example 3, the method of any of Examples 1-2 further includes that the update indicates a plurality of resources using a resource group identifier (ID).

In Example 4, the method of any of Examples 1-3 further includes that the group ID identifies a group of PUCCH resources.

In Example 5, the method of any of Examples 1-4 further includes that the update is received in a MAC-CE.

In Example 6, the method of any of Examples 1-5 further includes receiving, from the base station, an update of at least one of TCI state or a QCL assumption in association with the at least one of the plurality of CCs or the plurality of BWPs, the update being based on the transmitted message.

In Example 7, the method of any of Examples 1-6 further includes that the update is associated with one of a PDCCH or a PDSCH.

In Example 8, the method of any of Examples 1-7 further includes that the message is associated with one of a PUCCH, or a PUSCH on which the same spatial relation applies for the at least one of the plurality of CCs or the plurality of BWPs.

In Example 9, the method of any of Examples 1-8 further includes that the message is one of a beam report or a MAC CE.

Example 10 is a system or apparatus including one or more processors and memory in electronic communication with the one or more processors to cause the system or apparatus to implement a method as in any of Examples 1-9.

Example 11 is a system or apparatus including means for implementing a method or realizing an apparatus as in any of Examples 1-9.

Example 12 is a non-transitory computer readable medium storing instructions executable by one or more processors to cause the one or more processors to implement a method as in any of Examples 1-9.

Example 13 is a method of wireless communication of a base station that includes constructing a message associated with at least one of a plurality of CCs, a plurality of BWPs, or a plurality of UL/DL resources configuring multiple spatial parameters for the at least one of the plurality of CCs, the plurality of BWPs, or the plurality of UL/DL resources; and transmitting the message to a UE.

In Example 14, the method of Example 13 further includes that the message includes information indicating a plurality of resource groups associated with the plurality of BWPs or the plurality of CCs, and includes configuration information of the spatial parameters that applies for each of the plurality of resource groups associated with at least one of the plurality of BWPs, the plurality of CCs, or the plurality of UL/DL resources.

In Example 15, the method of any of Examples 13-14 further includes that each of the plurality of resource groups is based on at least one of a resource ID, a resource set ID, a CC ID, or a BWP ID or a combination thereof.

In Example 16, the method of any of Examples 13-15 further includes receiving, from the UE, an initial message associated with at least one of the plurality of CCs or the plurality of BWPs indicating a same spatial relation for the at least one of the plurality of CCs or the plurality of BWPs; constructing a single update message, based on the message received from the UE, including re-configuration information of the spatial parameters for each of the plurality of resource groups associated with at least one of the plurality of BWPs, the plurality of CCs, or the plurality of UL/DL resources; and transmitting the single update message to the UE.

In Example 17, the method of any of Examples 13-16 further includes that the single update message indicates a plurality of resources using a resource group ID.

In Example 18, the method of any of Examples 13-17 further includes that the group ID identifies a group of PUCCH resources.

In Example 19, the method of any of Examples 13-18 further includes that the single update message is received in a MAC-CE.

Example 20 is a system or apparatus including one or more processors and memory in electronic communication with the one or more processors to cause the system or apparatus to implement a method as in any of Examples 13-19.

Example 21 is a system or apparatus including means for implementing a method or realizing an apparatus as in any of Examples 13-19.

Example 22 is a non-transitory computer readable medium storing instructions executable by one or more processors to cause the one or more processors to implement a method as in any of Examples 13-19.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a base station, a first message indicating a group associated with at least one of a plurality of component carriers (CCs), a plurality of bandwidth parts (BWPs), or a plurality of uplink (UL)/downlink (DL) resources; and
   transmitting, to the base station, a second message associated with at least one of the plurality of CCs or the plurality of BWPs and indicating a simultaneous update of multiple spatial relations for each of the plurality of CCs or the plurality of BWPs based on the group that was indicated in the first message, wherein the second message includes identification information related to the at least one of the plurality of CCs or the plurality of BWPs, wherein the identification information includes information indicating a plurality of resource groups associated with the at least one of the plurality of CCs or the plurality of BWPs.

2. The method of claim 1, further comprising:
   receiving, from the base station, an update message updating at least one spatial relation from the multiple spatial relations in association with the at least one of the plurality of CCs or the plurality of BWPs, the update being based on the second message.

3. The method of claim 1, wherein the update indicates the plurality of resource groups using a resource group identifier (ID).

4. The method of claim 3, wherein the resource group ID identifies a group of physical uplink control channel (PUCCH) resources.

5. The method of claim 1, wherein the second message comprises a medium access control-control element (MAC-CE).

6. The method of claim 1, further comprising:
   receiving, from the base station, an update message updating at least one of transmission configuration indication (TCI) state or a quasi co-location (QCL) assumption in association with the at least one of the plurality of CCs or the plurality of BWPs, the update being based on the second message.

7. The method of claim 6, wherein the update message is associated with one of a physical downlink control channel (PDCCH) or a physical downlink shared channel (PDSCH).

8. The method of claim 1, wherein the second message is associated with one of a physical uplink control channel (PUCCH), or a physical uplink shared channel (PUSCH) on which a same spatial relation applies for the at least one of the plurality of CCs or the plurality of BWPs.

9. The method of claim 1, wherein the second message is one of a beam report or a medium access control (MAC) control element (CE).

10. An apparatus for wireless communication at a user equipment (UE), comprising:

a memory;
a transceiver; and
a processor, communicatively connected to the memory and the transceiver, the processor configured to:
receive, from a base station, a first message indicating a group associated with at least one of a plurality of component carriers (CCs), a plurality of bandwidth parts (BWPs), or a plurality of uplink (UL)/downlink (DL) resources;
transmit, to the base station, a second message associated with at least one of the plurality of CCs or the plurality of BWPs and indicating a simultaneous update of multiple spatial relations for each of the plurality of CCs or the plurality of BWPs based on the group that was indicated in the first message, wherein the second message includes identification information related to the at least one of the plurality of CCs or the plurality of BWPs, wherein the identification information includes information indicating a plurality of resource groups associated with the at least one of the plurality of CCs or the plurality of BWPs.

11. The apparatus of claim 10, the at least one processor further configured to:
receive, from the base station, an update message updating at least one spatial relation from the multiple spatial relations in association with the at least one of the plurality of CCs or the plurality of BWPs, the update being based on the second message.

12. The apparatus of claim 10, wherein the update indicates the plurality of groups using a resource group identifier (ID).

13. The apparatus of claim 12, wherein the resource group ID identifies a group of physical uplink control channel (PUCCH) resources.

14. The apparatus of claim 10, wherein the second message comprises a medium access control-control element (MAC-CE).

15. The apparatus of claim 10, the at least one processor further configured to:
receive, from the base station, an update message updating at least one of transmission configuration indication (TCI) state or a quasi co-location (QCL) assumption in association with the at least one of the plurality of CCs or the plurality of BWPs, the update being based on the second message.

16. The apparatus of claim 15, wherein the update message is associated with one of a physical downlink control channel (PDCCH) or a physical downlink shared channel (PDSCH).

17. The apparatus of claim 10, wherein the second message is associated with one of a physical uplink control channel (PUCCH), or a physical uplink shared channel (PUSCH) on which a same spatial relation applies for the at least one of the plurality of CCs or the plurality of BWPs.

18. The apparatus of claim 10, wherein the second message is one of a beam report or a medium access control (MAC) control element (CE).

19. An apparatus for wireless communication at a user equipment (UE), comprising:
means for receiving, from a base station, a first message indicating a group associated with at least one of a plurality of component carriers (CCs), a plurality of bandwidth parts (BWPs) or a plurality of uplink (UL)/downlink (DL) resources;
means for transmitting to the base station, a second message associated with at least one of the plurality of CCs or the plurality of BWPs and indicating a simultaneous update of multiple spatial relations for each of the plurality of CCs or the plurality of BWPs based on the group that was indicated in the first message, wherein the second message includes identification information related to the at least one of the plurality of CCs or the plurality of BWPs, wherein the identification information includes information indicating a plurality of resource groups associated with the at least one of the plurality of CCs or the plurality of BWPs.

20. The apparatus of claim 19, further comprising:
means for receiving, from the base station, an update message updating at least one spatial relation from the multiple spatial relations in association with the at least one of the plurality of CCs or the plurality of BWPs, the update being based on the second message.

21. The apparatus of claim 19, wherein the update indicates the plurality of resource groups using a resource group identifier (ID).

22. The apparatus of claim 21, wherein the resource group ID identifies a group of physical uplink control channel (PUCCH) resources.

23. The apparatus of claim 19, wherein the second message comprises a medium access control-control element (MAC-CE).

24. The apparatus of claim 19, further comprising:
means for receiving, from the base station, an update message updating at least one of transmission configuration indication (TCI) state or a quasi co-location (QCL) assumption in association with the at least one of the plurality of CCs or the plurality of BWPs, the update being based on the second message.

25. The apparatus of claim 24, wherein the update message is associated with one of a physical downlink control channel (PDCCH) or a physical downlink shared channel (PDSCH).

26. The apparatus of claim 19, wherein the second message is associated with one of a physical uplink control channel (PUCCH), or a physical uplink shared channel (PUSCH) on which a same spatial relation applies for the at least one of the plurality of CCs or the plurality of BWPs.

27. The apparatus of claim 19, wherein the second message is one of a beam report or a medium access control (MAC) control element (CE).

28. A non-transitory computer-readable medium storing computer executable code at a user equipment (UE), the code when executed by at least one processor causes the UE to:
receive, from a base station, a first message indicating a group associated with at least one of a plurality of component carriers (CCs), a plurality of bandwidth parts (BWPs), or a plurality of uplink (UL)/downlink (DL) resources; and
transmit, to the base station, a second message associated with at least one of the plurality of CCs or the plurality of BWPs and indicating a simultaneous update of multiple spatial relations for each of the plurality of CCs or the plurality of BWPs based on the group that was indicated in the first message, wherein the second message includes identification information related to the at least one of the plurality of CCs or the plurality of BWPs, wherein the identification information includes information indicating a plurality of resource groups associated with the at least one of the plurality of CCs or the plurality of BWPs.

29. The non-transitory computer-readable medium of claim 28, wherein the processor is further configured to:

receive, from the base station, an update message updating at least one spatial relation from the multiple spatial relations in association with the at least one of the plurality of CCs or the plurality of BWPs, the update being based on the second message.

30. The non-transitory computer-readable medium of claim 28, wherein the update indicates the plurality of resource groups using a resource group identifier (ID).

31. The non-transitory computer-readable medium of claim 30, wherein the resource group ID identifies a group of physical uplink control channel (PUCCH) resources.

32. The non-transitory computer-readable medium of claim 28, wherein the second message comprises a medium access control-control element (MAC-CE).

33. The non-transitory computer-readable medium of claim 28, further comprising receiving, from the base station, an update message updating at least one of transmission configuration indication (TCI) state or a quasi co-location (QCL) assumption in association with the at least one of the plurality of CCs or the plurality of BWPs, the update being based on the second message.

34. The non-transitory computer-readable medium of claim 33, wherein the update message is associated with one of a physical downlink control channel (PDCCH) or a physical downlink shared channel (PDSCH).

35. The non-transitory computer-readable medium of claim 28, wherein the second message is associated with one of a physical uplink control channel (PUCCH), or a physical uplink shared channel (PUSCH) on which a same spatial relation applies for the at least one of the plurality of CCs or the plurality of BWPs.

36. The non-transitory computer-readable medium of claim 28, wherein the second message is one of a beam report or a medium access control (MAC) control element (CE).

* * * * *